3,280,115
STEROID LACTONES AND LACTOLS AND
PREPARATION THEREOF
Daniel Bertin, Montrouge, and Jacques Perronnet, Paris, France, assignors to Roussel-Uclaf, S.A., Paris, France, a corporation of France
No Drawing. Filed Apr. 11, 1963, Ser. No. 272,224
Claims priority, application France, Apr. 18, 1962, 894,925; Dec. 7, 1962, 917,918
12 Claims. (Cl. 260—239.55)

The invention relates to a novel process for the preparation of lactones of ω-(unsaturated steroid)-propionic acid in which the lactone radical is situated in the 16- or 17-position of the steroid. The invention also relates to novel unsaturated steroid compounds having the formula

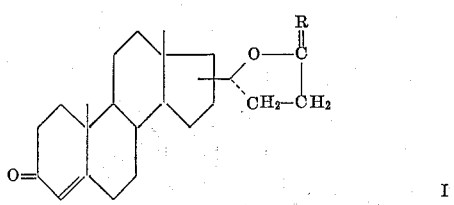

I wherein R is a radical selected from the group consisting of

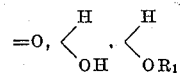

where $R_1$ is selected from the group consisting of lower alkyl, phenyl lower alkyl and an acyl radical of an organic carboxylic acid having 1 to 7 carbon atoms and 1',1'-diethers of the said steroid wherein the group attached to the D ring is in the 16 or 17-position, with the exception of the lactone of ω-(Δ⁴-androstene-17β-ol-3-one-17α-yl)-propionic acid. The invention further relates to novel intermediates of the steroid lactones of Formula I.

All prior art processes for the production of 16- or 17-steroid lactones from unsaturated steroids have passed through the corresponding 16- or 17-ethynylated derivative which was then reduced by catalytic hydrogenation which affected the other non-saturated portions of the steroid nucleus. The novel process of the invention does not require a reducing step and, therefore, other unsaturated portions of the steroid nucleus are not affected.

It is an object of the invention to provide a novel process for the preparation of lactones of ω-(unsaturated steroid)-propionic acid in which the lactone radical is located in the 16- or 17-position.

It is another object of the invention to provide novel unsaturated steroid compounds of Formula I.

It is a further object of the invention to provide novel intermediates for the novel unsaturated steroid compounds of Formula I.

These and other objects and advantages of the invention will become obvious from the following detailed description.

The novel process of the invention for the preparation of a lactone selected from the group consisting of lactones of ω-(unsaturated androstanes-16β-ol-16α-yl)-propionic acid and lactones of ω-(unsaturated androstanes-17β-ol-17α-yl)-propionic acid comprises reacting a compound selected from the group consisting of unsaturated androstane-16-ones and unsaturated androstane-17-ones with the Grignard derivative of a ketonide of 1,2-dihydroxy-4-halo-butane having the formula

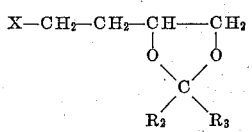

wherein $R_2$ and $R_3$ are alkyl radicals having 1 to 10 carbon atoms and X is a halogen to form the corresponding ketonide of a member selected from the group consisting of 16α-(3',4'-dihydroxybutyl)-unsaturated androstane-16β-ols and 17α-(3',4'-dihydroxybutyl)-unsaturated androstane-17β-ols, hydrolyzing the said ketonide under acidic conditions to form a member selected from the group consisting of 16α-(3',4'-dihydroxybutyl)-unsaturated androstane-16β-ols and 17α-(3',4'-dihydroxybutyl)-unsaturated androstane-17β-ols, simultaneously degrading and cyclizing the lateral chain of the latter with periodic acid to form an epoxy compound selected from the group consisting of 1',16β-epoxy-16α-(1'ξ-hydroxypropyl)-unsaturated androstane and 1',17β-epoxy-17α-(1'ξ-hydroxypropyl)-unsaturated androstane and oxidizing the latter to form a lactone selected from the group consisting of lactones of ω-(unsaturated androstanes-16β-ol-16α-yl)-propionic acid and lactones of ω-(unsaturated androstane-17β-ol-17α-yl)-propionic acid.

A variation of the process of the invention resides in forming the desired lactone in one step from 16β- or 17β-hydroxy-16α- or 17α-(3',4'-dihydroxybutyl)-unsaturated androstane by oxidizing the latter with chromic acid anhydride or a mixture of sulfuric acid and chromic acid. This variation uses more economical reactants and gives higher yields. The process of the invention is outlined in Table I.

TABLE I

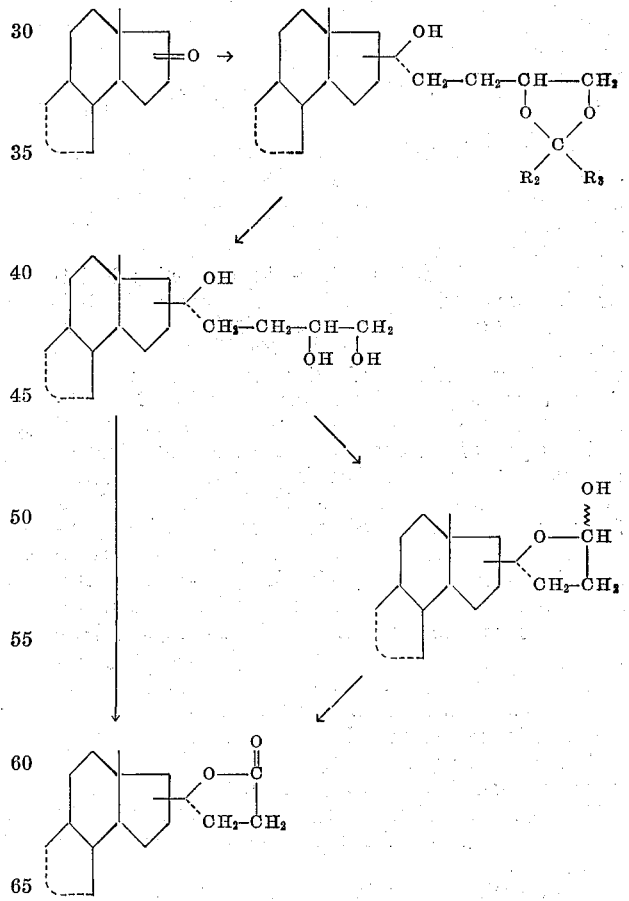

If the unsaturated androstane starting material possesses other keto groups which will react with the Grignard reagent of the ketonide of 1,2-dihydroxy-4-halo-butane, they can be protected by the formation of an enamine by reaction with a secondary amine selected from the group consisting of dilower alkylamines, pyrrolidine, piperidine and morpholine. The enamine grouping will be simultaneously hydrolyzed to the free keto group when the ketonide intermediate is subjected to acid hydrolysis to free the hydroxyl groups. The other keto group can also be protected by the formation of an enol ether.

Examples of suitable androstenes which can be used as starting materials for the process of the invention are $\Delta^4$-androstene-3,17 - dione, $\Delta^4$-androstene-3,16 - dione, $\Delta^4$-androstene-17-one, $\Delta^4$-androstene-16-one, $\Delta^{1,4}$-androstadiene-17-one, $\Delta^{1,4}$-androstadiene-16-one.

The novel steroid compounds of the invention have the formula

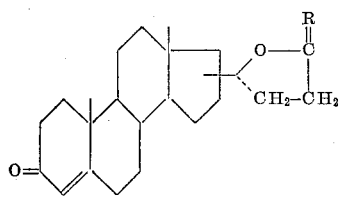

I wherein R is a radical selected from the group consisting of

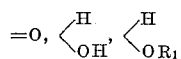

where $R_1$ is selected from the group consisting of lower alkyl, phenyl lower alkyl and an acyl radical of an organic carboxylic acid having 1 to 7 carbon atoms and 1',1'-diethers of the said steroid wherein the group attached to the D ring is in the 16 or 17 position, with the exception of the lactone of $\omega$-($\Delta^4$-androstene-17$\beta$-ol-3-one-17$\beta$-yl)-propionic acid. Certain of the compounds of Formula I possess anti-aldosteronic activity.

A preferred mode of the process of the invention for producing the lactone of $\omega$-($\Delta^4$-androstene-17$\beta$-ol-3-one-17$\alpha$-yl)-propionic acid comprises reacting $\Delta^4$-androstene-3,17-dione with a secondary amine selected from the group consisting of dilower alkyl amine, pyridine, pyrrolidine, and morpholine, preferably pyrrolidine in a lower alkanol, such as methanol to form the corresponding 3-enamino-$\Delta^{3,5}$-androstadiene-17-one, reacting the latter with a magnesium derivative of a ketonide of 1,2-dihydroxy-4-halo-butane, preferably a magnesium derivative of 1,2-isopropylidenedioxy-4-bromo-butane is a solvent, such as a mixture of either and benzene to form the corresponding ketonide of the 3-enamino-17$\alpha$-(3',4'-dihydroxybutyl)-$\Delta^{3,5}$-androstadiene-17$\beta$-ol, simultaneously hydrolysis of the enamine and alcohol functions of the latter in the presence of acetic acid and sodium acetate to form 17$\alpha$-(3'4'-dihydroxybutyl)-$\Delta^4$-androstene-17$\beta$-ol-3-one or stepwise hydrolysis of the said ketonide by reaction with a mineral acid, such as hydrochloric acid to form 3 - enamino-17$\alpha$-(3',4'-dihydroxybutyl)-$\Delta^{3,5}$-androstadiene-17$\beta$-ol followed by reaction with sodium acetate and acetic acid to form 17$\alpha$-(3',4'-dihydroxybutyl)-$\Delta^4$-androstene-17$\beta$-ol-3-one, simultaneously degrading the lateral chain and cyclizing the latter with periodic acid in an aqueous alkanol, such as aqueous t-butanol or 50% methanol in the presence of sodium hydroxide or lithium carbonate to form 1',17$\beta$-epoxy-17$\alpha$-(1'$\xi$-hydroxypropyl)-$\Delta^4$-androstene-3-one, oxidizing the latter with a sulfuric acid-chromic acid mixture in aqueous acetone to form the lactone of $\omega$ - ($\Delta^4$ - androstene-17$\beta$-ol-3-one-17$\alpha$-yl)-propionic acid.

As a variation of the said process, 17$\alpha$-(3',4'-dihydroxybutyl)-$\Delta^4$-androstene-17$\beta$-ol-3-one can be oxidized with chromic acid anhydride in an aqueous acetic acid solution or a solution of sulfuric and chromic acids in acetone to form the lactone of $\omega$-($\Delta^4$-androstene-17$\beta$-ol-3-one-17$\alpha$-yl)- propionic acid. The process is illustrated in Table II.

TABLE II

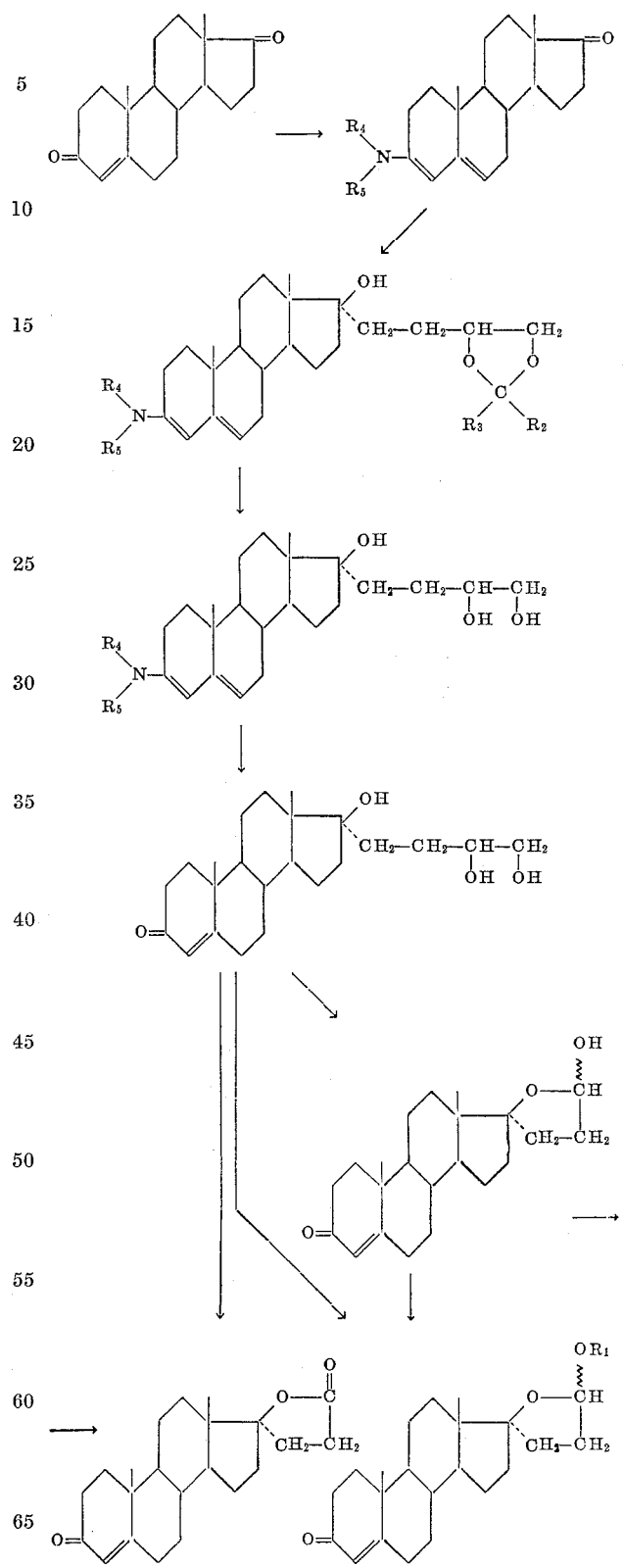

Wherein $R_1$ has the above definition and $R_2$ and $R_3$ are lower alkyl radicals having 1 to 10 carbon atoms and $R_4$ and $R_5$ are lower alkyl radicals having 1 to 7 carbon atoms and when taken together with the nitrogen atom are selected from the group consisting of pyrrolidyl, morpholino and piperidino.

By analogous process, the lactone of $\omega$-($\Delta^4$-androstene-16$\beta$-ol-3-one-16$\alpha$-yl)-propionic acid can be prepared by starting with Δ⁴-androstene-3,16-dione to form 3-enamino-Δ³,⁵-androstadiene-16-one, then the ketonide of 3-enamino-16α - (3',4' - dihydroxybutyl) - Δ³,⁵-androstadiene-16β-ol,16α - (3',4' - dihydroxybutyl)-Δ⁴-androstene-16β-ol-3-one, 1',16β - epoxy - 16α-(1'ξ-hydroxypropyl)-Δ⁴-androstene-3-one and finally the lactone of ω-(Δ⁴-androstene-16β-ol-3-one-16α-yl)-propionic acid. The process is illustrated in Table III.

TABLE III

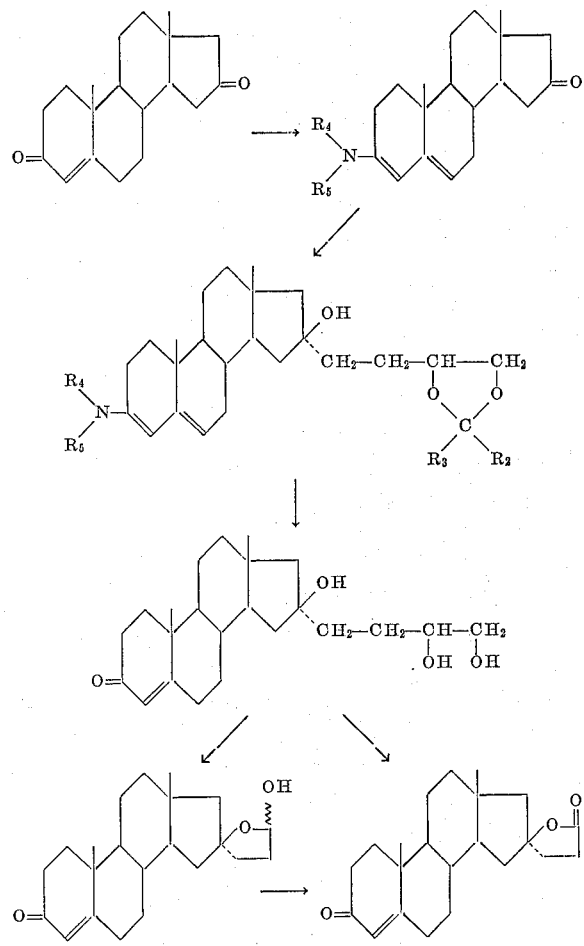

wherein $R_2$ and $R_3$ are lower alkyl radicals having 1 to 10 carbon atoms and $R_4$ and $R_5$ are lower alkyl radicals having 1 to 7 carbon atoms and when taken together with the nitrogen atom are selected from the group consisting of pyrrolidyl, morpholino and piperidino.

The compounds of Formula I when R is

can be easily prepared from 1',16β- or 17β-epoxy-16α- or 17α-(1'ξ-hydroxylpropyl)-Δ⁴-androstene-3-one by a number of the usual means of producing ethers and esters. For example, by reaction of the said epoxy compounds with an acid anhydride of an organic carboxylic acid having 1 to 7 carbon atoms, such as acetic acid anhydride, the corresponding 1',16β- or 17β-epoxy-16α- or 17α-(1'ξ-acyloxypropyl)-Δ⁴-androstene-3-one can be prepared. The corresponding ethers can be produced by reacting the said epoxy compounds with the desired alcohol in the presence of an acid or the desired halide derivative in the presence of silver oxide. The corresponding diether of the said epoxy compound can be easily prepared by reacting the said epoxy compound in the presence of ammonium periodate.

When R is other than a keto group, the compounds of Formula I are epimeric. In order to distinguish the two epimers in this application, the epimer having the lower rotatory power is designated as "Epimer A" while the epimer having the higher rotatory power is designated as "Epimer B." If desired, the A and B epimer can be isolated by the customary methods.

The ketonides of 1,2-dihydroxy-4-halo-butane which are used in the first step of the process of the invention are more fully described in commonly assigned, copending U.S. application Serial No. 272,230 filed on even date herewith.

In the following examples there are described several preferred embodiments to illustrate the invention. However, it should be understood that the invention is not intended to be limited to the specific embodiments.

Example 1.—Preparation of 1,2-isopropylidenedioxy-4-bromo-butane

STEP A: PREPARATION OF 1,2-ISOPROPYLIDENE-DIOXY-4-HYDROXY-BUTANE

A mixture of 250 gm. of 1,2,4-trihydroxy-butane, 3 liters of acetone and 25 cc. of 65% perchloric acid was prepared and was allowed to stand at room temperature for about 2 hours under a nitrogen atmosphere with agitation. 65 gm. of sodium carbonate were added and the agitation was continued for another hour. The reaction mixture was filtered and 1.5 cc. of triethylamine were added to the filtrate. The acetone was then removed under slight vacuum and the solution was distilled under a vacuum of 20 mm. Hg. 252 gm of 1,2-isopropylidenedioxy-4-hydroxy-butane distilling at 107–109° C. (20 mm. Hg) were recovered. The product had a boiling point of 207° C. at 760 mm. Hg and an index of refraction $n_D^{20}=1.439$.

The product was soluble in alcohol and acetone, insoluble in water and dilute aqueous alkalis while dilute aqueous acids decomposed it.

STEP B: PREPARATION OF THE MESYLATE OF 1,2-ISO-PROPYLIDENEDIOXY-4-HYDROXY-BUTANE 100 gm. of 1,2-isopropylidenedioxy-4-hydroxy-butane were dissolved in 125 cc. of pyridine. The solution was cooled to −40° C. and slowly 54 cc. of mesyl chloride were introduced. Then the temperature was allowed to rise to between −10 and −5° C. and the reaction mixture was agitated for a period of 2 hours. Next the temperature was allowed to return to room temperature and the reaction mixture was added to water. The mixture was extracted with ether and the extract was successively washed with a solution of sodium bicarbonate, a normal solution of sodium hydroxide and allowed to stand overnight under agitation with a solution of sodium bicarbonate in the presence of triethylamine. The ethereal extract was then washed with a saturated salt solution, dried over magnesium sulfate, concentrated under nitrogen and 140 gm. of liquid mesylate of 1,2-isopropylidene-dioxy-4-hydroxy-butane were obtained.

This compound was soluble in chloroform and insoluble in water and dilute aqueous alkalis while dilute aqueous acids decomposed it.

In a similar fashion, 1,2 - isopropylidenedioxy - 4-hydroxy-butane could be reacted with acetic acid anhydride in pyridine to form the liquid acetate of 1,2-isopropylidenedioxy-4-hydroxy-butane having a boiling point of 205° C. at 760 mm. Hg and an index of refraction $n_D^{20}=1.430$.

The product was soluble in chloroform, slightly soluble in ether and insoluble in water and dilute aqueous alkalis while dilute aqueous acids decomposed it.

STEP C: PREPARATION OF 1,2-ISPROPYLIDENEDIOXY-4-BROMO-BUTANE 280 gm. of lithium bromide were introduced into 1,400 cc. of acetone and 140 gm. of the mesylate of 1,2-isopropylidenedioxy-4-hydroxy-butane and 7.5 cc. of triethylamine were added. The reaction mixture was heated to reflux under agitation for a period of about 5 hours. After 1,500 cc. of water were added, the organic phase was separated and the hydro-acetonic phase was extracted with ether. The ethereal extract was dried and concentrated under nitrogen. The residue from the ethereal extract was added to the organic phase and the solution was allowed to stand over potassium carbonate in the presence of triethylamine. Then the solution was filtered, distilled under vacuum in order to obtain 55 gm. of 1,2-isopropylidenedioxy-4-bromo-butane having a boiling point (under 18–19 mm. Hg) of 89–90° C. and an index of refraction $n_D^{22} = 1.462$.

The product was soluble in acetone and chloroform and insoluble in water and dilute aqueous alkalis while dilute aqueous acids decomposed it.

*Analysis.*—$C_7H_{13}O_2Br$; molecular weight=209.09. Calculated: C, 40.20%; H, 6.26%; Br, 38.22%. Found: C, 40.3%; H, 6.1%; Br, 37.9%.

1,2-isopropylidenedioxy-4-bromo-butane could be easily hydrolyzed, if desired, by the action of an acid, such as hydrochloric acid to obtain 1,2-dihydroxy-4-bromobutane having an index of refraction $n_D^{26} = 1.475$. This product was soluble in chloroform, alcohol and water.

*Example II.—Preparation of the lactone of ω-(Δ⁴-androstene-16β-ol-3-one-16α-yl)-propionic acid*

STEP A: PREPARATION OF 3-PYRROLIDYL-Δ³,⁵-ANDROSTADIENE-16-ONE 7.07 gm. of Δ⁴-androstene-3,16-dione were dissolved in 140 cc. of methanol and 3.5 cc. of pyrrolidine were added under agitation and under an atmosphere of nitrogen. The reaction mixture was maintained under nitrogen and under agitation at room temperature for a period of about 15–20 minutes. The precipitate formed was then vacuum filtered, washed with methanol and dried. 6.76 gm. of raw 3-pyrrolidyl-Δ³,⁵-androstadiene-16-one were obtained. Starting from the mother liquors, a second lot of 685 mg. of product were obtained by crystallization. The product was purified by solution in benzene followed by precipitation in methanol. The purified product had a melting point of 193–194° C.

The product was soluble in benzene and chloroform, slightly soluble in alcohols and in ether and insoluble in water and dilute aqueous alkalis while dilute aqueous acids saponified it.

*Analysis.*—$C_{23}H_{33}ON$; molecular weight=339.50. Calculated: C, 81.36%; H, 9.80%; N, 4.12%. Found: C, 81.2%; H, 9.6%; N, 4.4%.

This compound is not described in the literature.

The starting compound was prepared according to the method described by Fajkos et al., Chem. Listy., 47, 1207 (1953).

STEP B: PREPARATION OF 16α-(3',4'-DIHYDROXY-BUTYL)-Δ⁴-ANDROSTENE-16β-OL-3-ONE 2.04 gm. of magnesium were introduced into 30 cc. of ether and several milliliters of a solution of 16.72 gm. of 1,2-isopropylidenedioxy-4-bromo-butane in 80 cc. of ether were added slowly under dry nitrogen and under agitation. After refluxing had commenced, in about one hour, the said solution was combined with a solution of 7.22 gm. of 3-pyrrolidyl-Δ³,⁵-androstadiene-16-one in 80 cc. of benzene. The reaction mixture was maintained under agitation and at room temperature for a period of about 21 hours and then 100 cc. of a saturated solution of ammonium chloride were slowly added under agitation. The organic phase was separated, washed with water, dried over magnesium sulfate and concentrated under nitrogen. After the product crystallized, the last traces of benzene were entrained by methanol and a methanolic suspension was obtained which was cooled to 0° C. The crystals formed were vacuum filtered, washed with methanol and dried. 3.56 gm. of the acetonide of raw 3-pyrrolidyl-16α-(3',4'-dihydroxybutyl)-Δ³,⁵-androstadiene-16β-ol were obtained.

A second lot of 0.48 gm. of product was obtained from the mother liquors. The entire amount of product was recrystallized from isopropyl ether to obtain a product having a melting point towards 204° C. which was used as such for the next step of the synthesis.

This compound is not described in the literature.

1.5 gm. of the acetonide of 3-pyrrolidyl-16α-(3',4'-dihydroxy-butyl) - Δ³,⁵ - androstadiene-16β-ol were dissolved in 15 cc. of acetic acid containing 50% of water. Then 3 gm. of sodium acetate were added and the reaction mixture was heated under agitation and under an atmosphere of nitrogen in an oil bath at 100° C. for a period of about one hour. The reaction mixture was then cooled with an ice bath, neutralized with sodium hydroxide solution and 15 cc. of methanol were added. Then the addition of alkali was continued until a pH of 10 was reached. The solution was neutralized by the addition of hydrochloric acid and poured into a saturated salt solution. The precipitate formed was extracted with ethyl acetate and the extract was washed with a saturated salt solution and concentrated. The residue was taken up with a mixture of benzene and ethyl acetate and the solution was allowed to stand for crystallization. 691 mg. of raw 16α-(3',4'-dihydroxybutyl)-Δ⁴-androstene-16β-ol-3-one were obtained which were dissolved in boiling benzene. The solution was cooled and allowed to stand for crystallization. The crystals were vacuum filtered and dried to obtain the product having a melting point of 140–142° C.

This product was soluble in alcohol, chloroform, ethyl acetate, slightly soluble in benzene and insoluble in water.

*Analysis.*—$C_{23}H_{36}O_4$; molecular weight=376.52. Calculated: C, 73.36%; H, 9.64%. Found: C, 73.0%; H, 9.6%.

This compound is not described in the literature.

STEP C: PREPARATION OF 1',16β-EPOXY-16α-(1'ξ-HYDROXYPROPYL)-Δ⁴-ANDROSTENE-3-ONE 150 mg. of 16α-3',4'-dihydroxy-butyl)-Δ⁴-androstene-16β-ol-3-one were dissolved in 10 cc. of tert.-butanol and a solution of 300 mg. of periodic acid, 10 cc. of water and 75 mg. of lithium carbonate was added thereto. The resulting mixture was subjected to agitation at room temperature for a period of about 3 hours and then water was added thereto. The crystals formed were vacuum filtered, washed with water and dried. 118 mg. of raw 1',16β-epoxy-16α-(1'ξ-hydroxypropyl)-Δ⁴-androstene-3-one were obtained which could be purified by recrystallization in aqueous tert.-butanol. The purified product had a melting point of 150° C. (not sharp) and a specific rotation $[\alpha]_D^{20} = +57° \pm 2°$ (c.=0.5% in dioxane).

This compound was soluble in alcohol and chloroform and insoluble in water and dilute aqueous acids and alkalis.

*Analysis.*—$C_{22}H_{32}O_3$; molecular weight=344.48. Calculated: C, 76.70%; H, 9.36%. Found: C, 76.9%; H, 9.4%.

This compound is not described in the literature. It occurred in the form of a mixture of A and B epimers.

STEP D: PREPARATION OF THE LACTONE OF ω-(Δ⁴-ANDROSTENE-16β-OL-3-ONE-16α-YL)-PROPIONIC ACID 140 mg. of 1',16β-epoxy-16α-(1'ξ-hydroxypropyl-Δ⁴-androstene-3-one were placed in suspension in 10.5 cc. of acetone and 3.5 cc. of water. The solution was cooled to 0° C. and then under agitation 0.15 cc. of a sulfochromic acid solution of 135 gm. of chromic acid, 115 cc. of sulfuric acid and water to make 500 cc. of solution was added. The reaction mixture was allowed to return to room temperature and agitation was continued for a period of one hour. Then 1 cc. of methanol was added in order to destroy the excess of the oxidant and the mixture was poured into water. The precipitate was extracted with methylene chloride and the extracts were combined and washed with water, dried and concentrated to dryness. The residue was taken up in ether, crystallized and 75 mg. of the raw lactone of ω-(Δ⁴-androstene-16β-ol-3-one-16α-yl)-propionic acid were obtained which when recrystalized from a mixture of benzene and isopropyl ether had a melting point of 168° C. and a specific rotation $[\alpha]_D^{20} = +39°$ (c.±0.5% in dioxane).

This compound was soluble in alcohol, acetone, benzene and chloroform, slightly soluble in ether and insoluble in water and dilute aqueous acids and alkalis.

*Analysis.*—$C_{22}H_{30}O_3$; molecular weight=342.46. Calculated: C, 77.15%; H, 8.83%. Found: C, 76.9%; H, 8.8%.

Infrared spectrum: A band showing the γ-lactone occurred at 1,766 cm.$^{-1}$

This compound is not described in the literature.

*Example III.—Preparation of the lactone of ω-(Δ⁴-androstene-17β-ol-3-one-17α-yl)-propionic acid*

STEP A: PREPARATION OF 3-PYRROLIDYL-Δ$^{3,5}$-ANDROSTADIENE-17-ONE 10 gm. of Δ⁴,17-dione were introduced under nitrogen into 200 cc. of methanol and 5 cc. of pyrrolidine were added under agitation. The solution was maintained under an atmosphere of nitrogen and under agitation at room temperature for a period of 15 to 20 minutes. The precipitate formed was vacuum filtered, triturated with methanol and dried. 11.6 gm. of raw 3-pyrrolidyl-Δ$^{3,5}$-androstadiene-17-one having a melting point of 224° C. were obtained which was used as such for the following step of the synthesis.

The product was soluble in benzene and insoluble in water and alcohol.

The starting compound of this step was prepared according to the method described by Ruzicka et al., Helv. Chim. Acta., 18, 986 (1935).

STEP B: PREPARATION OF 17α-(3',4'-DIHYDROXY-BUTYL)-Δ⁴-ANDROSTENE-17β-OL-3-ONE 5.5 gm. of magnesium were introduced into 40 cc. of ether and several milliliters of a solution of 47 gm. of 1,2-isopropylidenedioxy-4-bromo-butane in 200 cc. of ether were introduced slowly under dry nitrogen and under agitation. When reflux started the remainder of the said solution and a solution of 11.7 gm. of 3-pyrrolidyl-Δ$^{3,5}$-androstadiene-17-one in 200 cc. of benzene were added simultaneously over a period of about 50 minutes.

The reaction mixture was maintained in a closed vessel under agitation and at room temperature for a period of 65 hours. Then the mixture was cooled to a temperature between about 0° and +10° C. and 50 cc. of a saturated solution of ammonium chloride were introduced. Agitation was continued for a period of about 30 minutes and then water was added thereto and the mixture was decanted. The organic solution was separated, washed with water and dried over magnesium sulfate. 50 mg. of hydroquinone were added thereto and the mixture was concentrated under nitrogen. 30 gm. of the raw acetonide of 3-pyrrolidyl-17α-(3',4'-dihydroxybutyl)-Δ$^{3,5}$-androstadiene-17β-ol were obtained which was used as such for the following step of the synthesis.

This compound is not described in the literature.

The raw acetonide of 3-pyrrolidyl-17α-(3',4'-dihydroxy-butyl)-Δ$^{3,5}$-androstadiene-17β-ol was introduced into 200 cc. of N hydrochloric acid and agitated under an atmosphere of nitrogen for a period of one hour. The undissolved part was separated and washed several times with chloroform containing methanol. The combined wash solutions were extracted with 50 cc. of N hydrochloric acid. The aqueous phases were combined, brought to alkalinity under nitrogen and under agitation by the addition of sodium hydroxide solution. The precipitate formed was separated and extracted with chloroform. The chloroform solution was washed with water until the wash waters were neutral, dried over magnesium sulfate and concentrated under nitrogen. 12 gm. of raw 3 - pyrrolidyl - 17α-(3',4'-dihydroxybutyl)-Δ$^{3,5}$-androstadiene-17β-ol were obtained which were used as such for the following step of the synthesis.

This compound is not described in the literature.

The raw 3-pyrrolidyl-17α-(3',4'-dihydroxybutyl)-Δ$^{3,5}$-androstadiene-17β-ol was added to a solution of 36 cc. of acetic acid, 36 cc. of water and 12 gm. of sodium acetate and the resulting solution was agitated for 30 minutes at room temperature. Then 70 cc. of sodium hydroxide solution and 500 cc. of methanol were added in order to dissolve the precipitate formed, and the solution was neutralized by the addition of about 20 cc. of concentrated hydrochloric acid. The solution was then concentrated under nitrogen until a precipitate appeared and then was extracted with methylene chloride. The extract was washed with water, dried upon magnesium sulfate and concentrated to obtain 8.4 gm. of raw 17α-(3',4'-dihydroxybutyl)-Δ⁴-androstene-17β - ol - one. The product was purified by subjecting it to chromatography through magnesium silicate with elution with methylene chloride containing 8% of methanol, crystallization and recrystallization from ether to obtain 2.6 gm. of purified product. A new purification was effected by recrystallization from isopropanol to obtain 980 mg. of 17α-(3',4'-dihydroxybutyl)-Δ⁴-androstene-17β - ol - 3 - one having a melting point of 194° C. A second lot of 840 mg. of product could be obtained from the mother liquors.

This compound was soluble in alcohol, slightly soluble in benzene and chloroform and insoluble in water and dilute aqueous alkalis.

*Analysis.*—$C_{23}H_{36}O_4$; molecular weight=376.52. Calculated: C, 73.36%; H, 9.64%. Found: C, 73.1%; H, 9.5%.

This compound is not described in the literature.

STEP C: PREPARATION OF 1',17β-EPOXY-17α-(1'ξ-HYDROXYPROPYL)-Δ⁴-ANDROSTENE-3-ONE 700 mg. of 17α-(3',4'-dihydroxybutyl)-Δ⁴-androstene-17β-ol-3-one were dissolved in 70 cc. of tert.-butanol and 1.5 cc. of water. Then under agitation a solution of 1.4 gm. of periodic acid, 70 cc. of water and 6 cc. of 1 N sodium hydroxide was added. The reaction mixture was allowed to stand in a closed vessel under agitation for a period of about 2 hours and then was added to water. The precipitate formed was extracted with chloroform and the organic solutions were washed with saturated salt solution, dried over magnesium sulfate, filtered and concentrated. The residue was taken up with ether and allowed to crystallize and the crystals were vacuum filtered. The crystals obtained were dissolved in benzene and the solution was filtered, concentrated and then isopropyl ether was added thereto. The mixture was then allowed to stand for crystallization.

The crystals formed were vacuum filtered and dried. 430 mg. of raw 1',17β-epoxy-17α-(1'ξ-hydroxypropyl)-Δ⁴-androstene-3-one were obtained which was purified by subjecting it to chromatography over magnesium silicate with elution with methylene chloride containing 5% of ether followed by recrystallization from ether. The purified product had melting points of 160 and 192° C. and a specific rotation $[\alpha]_D^{20} = +29.6°$ (c.=1% in dioxane). It occurred in the form of a mixture of epimers in which the A form largely predominated.

This compound was soluble in alcohol, benzene and chloroform, slightly soluble in ether and isopropyl ether, and insoluble in water and dilute aqueous acids and alkalis.

*Analysis.*—$C_{22}H_{32}O_3$; molecular weight=344.48. Calculated: C, 76.69%; H, 9.36%. Found: C, 76.6%; H, 9.4%.

This compound is not described in the literature.

By slow recrystallization of the mixture of the above epimers in benzene, the A epimeric form was isolated. This product had a melting point of 210° C. and a specific rotation $[\alpha]_D^{20} = +18°$ (c.=1% in diozane).

STEP D: PREPARATION OF THE LACTONE OF $\omega$-($\Delta^4$-ANDROSTENE-17$\beta$-OL-3-ONE-17$\alpha$-YL)-PROPIONIC ACID 100 mg. of 1',17$\beta$-epoxy-17$\alpha$-(1'$\xi$-hydroxypropyl)-$\Delta^4$-androstene-3-one were dissolved in a mixture of 4 cc. of acetone and 1.5 cc. of water and 0.1 cc. of a solution of 135 gm. of chromic acid, 115 cc. of sulfuric acid and enough water to form a final solution of 500 cc. were slowly added thereto under agitation. At the end of 30 minutes 1 cc. of methanol was added in order to destroy the excess of oxidant. Then 500 mg. of sodium carbonate were added in order to neutralize the solution. The reaction mixture was poured into water and then extracted with ether. The extract was washed until the wash waters were neutral, dried, concentrated to dryness and the resulting residue was made to crystallize with a little petroleum ether.

The product was taken up with methylene chloride and the solution was centrifuged and concentrated. A little bit of petroleum ether was added thereto and the solution was allowed to stand for crystallization. The crystals formed were vacuum filtered to obtain 70 mg. of the raw lactone of $\omega$-($\Delta^4$-androstene-17$\beta$-ol-3-one-17$\alpha$-yl)-propionic acid which was purified by recrystallization from isopropyl ether containing a little bit of methylene chloride. The purified product had a melting point of 165° C.

The product was soluble in chloroform, slightly soluble in isopropyl ether and insoluble in water.

Infrared spectrum: A band showing $\gamma$-lactone occurred at 1765 cm.$^{-1}$.

*Example IV.—Preparation of 1',17$\beta$-epoxy-17$\alpha$-(1'$\xi$-methoxypropyl)-$\Delta^4$-androstene-3-one*

METHOD A 300 mg. of 17$\alpha$-(3',4'-dihydroxybutyl)-$\Delta^4$-androstene-17$\beta$-ol-3-one produced in step B of Example III were dissolved in 10 cc. of methanol and 450 mg. of periodic acid were added thereto. The reaction mixture was allowed to stand under agitation at room temperature for a period of about 90 minutes and then the reaction mixture was poured into a dilute solution of sodium bicarbonate. The precipitate formed was extracted with ether and the extract was washed with water, dried and concentrated. The residue was taken up in heptane and crystallized therefrom to obtain 1',17$\beta$-epoxy-17$\alpha$-(1'$\xi$-methoxypropyl)-$\Delta^4$-androstene-3-one having a melting point of 132° C.

This compound is not described in the literature.

METHOD B

A mixture of 100 mg. of 1',17$\beta$-epoxy-17$\alpha$-(1'$\xi$-hydroxypropyl)-$\Delta^4$-androstene-3-one produced in step C of Example III, 2.5 cc. of methanol and 0.05 cc. of a N sulfuric acid solution were heated to reflux for one hour. Then water was solwly added until the solution began to become cloudy. The solution was cooled and crystallization was provoked mechanically. The crystals formed were vacuum filtered and dried 84 mg. of raw 1',17$\beta$-epoxy-17$\alpha$-(1'$\xi$ - methoxypropyl)-$\Delta^4$-androstene-3-one having a melting point of 130–132° C.

The product could be purified by recrystallization in cyclohexane to obtain a product having a melting point of 134–135° C. and a specific rotation $[\alpha]_D^{20} = +132.8°$ (c.=0.6% in dioxane).

The said product, as well as the product of method A, occurred in the form of a mixture of epimers in which the B form predominates.

The product was soluble in ether, benzene and chloroform, slightly soluble in cyclohexane and insoluble in water and dilute aqueous acids and alkalis.

*Analysis.*—$C_{23}H_{34}O_3$; molecular weight=358.50. Calculated: C, 77.05%; H, 9.56%. Found: C, 77.2%; H, 9.6%.

This compound is not described in the literature.

By washing with methanol and fractional crystallization of a mixture of the above epimers in methanol followed by heating and cooling, the B epimeric form was isolated, having a melting point of 143° C. and a specific rotation $[\alpha]_D^{20} = +140° \pm 1.5°$ (c.=0.7% in dioxane).

By crystallization starting from the methanolic wash liquors of the mixture of A and B epimers, having a strong predominence of the B form, a mixture of the said epimers was isolated containing 50% of 1',17$\beta$-epoxy-17$\alpha$-(1'$\xi$-methoxypropyl)-$\Delta^4$-androstene-3-one having a melting point of 123–124° C. and a specific rotation $$[\alpha]_D^{20} = +52.6° \pm 1°$$

(c.=1% in dioxane).

Starting from the 50% mixture of A and B epimers and by subjecting the same to chromatography through silica gel with elution with benzene containing 2.5% and 2% of acetone, the A form of 1',17$\beta$-epoxy-17$\alpha$-(1'$\xi$-methoxypropyl)-$\Delta^4$-androstene-3-one having a melting point of 25° C. and a specific rotation $[\alpha]_D^{20} = -25° \pm 2°$ (c.=0.65% in dioxane) was isolated. In order to purify the said epimers, one proceeds as described later in Example VII.

*Example V.—Preparation of the lactone of $\omega$-($\Delta^4$-androstene-16$\beta$-ol-3-one-16$\alpha$-yl)-propionic acid*

30 mg. of 16$\alpha$-(3',4'-dihydroxybutyl)-$\Delta^4$-androstene-16$\beta$-ol-3-one, produced in step B of Example II, where dissolved in 0.5 cc. of acetic acid and then while stirring 0.4 cc. of a solution of 4 gm. of chromic anhydride and 5 cc. of water in enough acetic acid to make 50 cc. of solution were added. The reaction mixture was maintained under agitation for a period of about 5 hours at room temperature and then methanol, water and ammonium hydroxide solution in order to neutralize the largest part of the acetic acid were added successively thereto. The solution was extracted with methylene chloride and the extract was washed with a solution of sodium bicarbonate and with water, dried and concentrated to dryness under vacuum. The residue was taken up with acetone containing one drop of sulfuric acid and water was added to the resulting solution. The precipitate formed was extracted, dried and crystallized from isopropyl ether and the crystals were vacuum filtered and dried. 15 mg. of the lactone of $\omega$-($\Delta^4$-androstene-16$\beta$-ol-3-one-16$\alpha$-yl)-propionic acid were obtained having a melting point of 168° C. and a specific rotation $[\alpha]_D^{20} = +39°$ (c.=0.5% in dioxane), identical to the product described in Example II.

*Example VI.—Preparation of the lactone of $\omega$-($\Delta^4$-androstene-17$\beta$-ol-3-one-17$\alpha$-yl)-propionic acid*

750 mg. of 17$\alpha$-(3',4'-dihydroxybutyl)-$\Delta^4$-androstene-17$\beta$-ol-3-one produced in step B of Example III were dissolved in 12 cc. of acetic acid and after cooling the resulting solution to 15° C., 10 cc. of a solution composed of 4 gm. of chromic acid anhydride and 5 cc. of water in enough acetic acid to make 50 cc. of solution were added thereto. The reaction mixture was subjected to agitation overnight at room temperature. Then 1.5 cc. of methanol and water were added. The solution was extracted with methylene chloride and the extract was washed with an aqueous solution of sodium bicarbonate and water, dried over magnesium sulfate and evaporated to dryness under vacuum.

The residue was taken up with 10 cc. of acetone containing a drop of concentrated sulfuric acid and after the resulting solution had stood at rest for a period of about 40 minutes at room temperature, it was added to water. The precipitate formed was vacuum filtered, washed with aqueous acetone and dried. 441 mg. of the lactone of $\omega$-($\Delta^4$-androstene-17$\beta$-ol-3-one-17$\alpha$-yl)-propionic acid having a melting point of 165° C., identical to the product described in Example III were obtained.

*Example VII.—Preparation of 1′,17β-epoxy-17α-(1′ξ-methoxypropyl)-Δ⁴-androstene-3-one*

1 gm. of 1′,17β-epoxy-17α-(1′ξ-hydroxypropyl)-Δ⁴-androstene-3-one were dissolved in 25 cc. of methanol and 0.5 cc. of a normal solution of sulfuric acid was added. The mixture was heated to reflux for a period of one hour and then water was slowly added until crystallization commenced. The crystals formed were vacuum filtered, washed with water, dried to obtain 957 mg. of raw 1′,17β-epoxy-17α-(1′ξ-methoxypropyl)-Δ⁴-androstene-3-one.

1,900 mg. of the said product were washed several times with methanol and then dissolved in hot methanol. The solution obtained was allowed to cool and to stand for crystallization. The crystals obtained were vacuum filtered, washed with a small amount of methanol and dried. The raw product obtained was recrystallized by heating and cooling in methanol. The crystals formed were vacuum filtered, washed and 322 mg. of the B epimer of 1′,17β-epoxy-17α-(1′ξ-methoxypropyl)-Δ⁴-androstene-3-one having a melting point of 143° C. and a specific rotation $[\alpha]_D^{20} = +140° \pm 1.5°$ (c.=0.7% in dioxane) were obtained.

The product was soluble in ether and chloroform, slightly soluble in cyclohexane and methanol, very slightly soluble in alcohol, and insoluble in water and dilute aqueous acids and alkalis.

*Analysis.*—$C_{23}H_{34}O_3$; molecular weight=358.50. Calculated: C, 77.05%; H, 9.56%. Found: C, 76.8%; H, 9.5%.

The methanolic liquors obtained from the washings of 1,900 mg. of raw 1′,17β-epoxy-17α-(1′ξ-methoxypropyl)-Δ⁴-androstene-3-one were combined and evaporated. The crystalline residue was taken up with hot methanol and the solution obtained was cooled and allowed to stand until crystallization occurred. The crystals obtained were vacuum filtered, dried, recrystallized by heating and cooling in methanol, vacuum filtered and dried. 516 mg. of 1′,17β-epoxy-17α-(1′ξ-methoxypropyl)-Δ⁴-androstene-3-one were obtained being a 50% mixture of A and B epimers having a melting point of 123–124° C. and a specific rotation $[\alpha]_D^{20} = 52.5° \pm 1°$ (c.=1% in dioxane).

The product was soluble in ether, benzene and chloroform, slightly soluble in cyclohexane and methanol, very slightly soluble in alcohols and insoluble in water and dilute aqueous acids and alkalis.

*Analysis.*—$C_{23}H_{34}O_3$; molecular weight=358.50. Calculated: C, 77.05%; H, 9.56%; O, 13.39%. Found: C, 77.0%; H, 9.5%; O, 13.8%.

Starting from the mixture of epimers rich in B form, only the B epimer and the 50% mixture of A and B epimers were isolated, by fractional crystallization. By contrast, chromatography through silica gel offered the possibility of separating the A and B epimers starting from the 50% mixture of the said epimers. Thus 900 mg. of a 50% mixture of A and B epimers was subjected to chromatography through silica gel with elution with benzene containing 2.5% of acetone. The first eluates giving a negative rotatory power were collected, again subjected to chromatography through silica gel with elution with benzene containing 2% of acetone and the product obtained was recrystallized from pentane. This gave 53 mg. of a product whose melting point was 125° C. and whose specific rotation was $[a]_D^{20} = -25° \pm 2°$ (c.= 0.65% in dioxane), which represented the A epimer of 1′,17β-epoxy-17α-(1′ξ-methoxypropyl)-Δ⁴-androstene-3-one.

*Example VIII.—Preparation of 1′,17β-epoxy-17α-(1′ξ-benzyloxypropyl)-Δ⁴-androstene-3-one*

METHOD A 0.2 cc. of a normal solution of sulfuric acid and 1 cc. of benzyl alcohol were added under agitation to a suspension of 689 mg. of 1′,17β-epoxy-17α-(1′ξ-hydroxypropyl)-Δ⁴-androstene-3-one in 7 cc. of benzene. The reaction mixture was maintained under agitation and at reflux for a period of about 2 hours. Then the reaction mixture was allowed to cool and an excess of potassium carbonate was added. The mixture was subjected to agitation, vacuum filtered, about a milliliter of triethylamine was added and the solution was concentrated. The remainder of the benzyl alcohol was then removed by entrainment by steam distillation and the mixture was allow to stand for recrystallization for a period of about 48 hours. The crystals obtained were vacuum filtered and washed with isopropyl ether.

The product obtained was dissolved in hot cyclohexane and then allowed to crystallize under cooling to obtain 214 mg. of 1′,17β-epoxy-17α-(1′ξ-benzyloxypropyl)-Δ⁴-androstene-3-one. The repeated crystallization operation gave a product whose melting point was 158° C. and specific rotation $[\alpha]_D^{20} = -35° \pm 1.5°$ (c.=0.7% in dioxane).

The product was soluble in benzene and chloroform, slightly soluble in alcohol, ether and cyclohexane and insoluble in water and hexane.

*Analysis.*—$C_{29}H_{38}O_3$; molecular weight=434.59. Calculated: C, 80.14%; H, 8.81%. Found: C, 80.0%; H, 8.8%.

This product is not described in the literature.

The above product was the A epimer, having a lower rotatory power, of the above compound. The mixture of epimers rich in B epimer having a higher rotatory power was isolated from the mother liquors and the liquors of recrystallization, which were combined, and subjected to chromatography through magnesium silicate with elution with benzene containing 0.75% of acetone. The B epimer has not been crystallized.

METHOD B 2.064 gm. of 1′,17β-epoxy-17α-(1′ξ-hydroxypropyl)-Δ⁴-androstene-3-one were dissolved in 40 cc. of acetone. After 7.44 cc. of benzyl bromide were added and 13.86 gm. of silver oxide were placed in suspension, the reaction mixture was subjected to agitation under an atmosphere of nitrogen at room temperature for a period of 24 hours, filtered and concentrated under vacuum. The mixture was purified by steam distillation and the 5.35 gm. of raw product obtained were subjected to chromatography through magnesium silicate with elution with benzene containing 1% of acetone. A recrystallization in cyclohexane gave 404.5 mg. of 1′,17β-epoxy-17α-(1′ξ-benzyloxypropyl)-Δ⁴-androstene-3-one having a melting point of 158° C. and a specific rotation $$[\alpha]_D^{20} = -29° \pm 1.5°$$

(c.=0.8% in dioxane), which corresponded to the A epimer obtained according to method A.

METHOD C 200 mg. of 1′,17β-epoxy-17α-(1′ξ-methoxypropyl)-Δ⁴-androstene-3-one (A epimer) were dissolved in 2 cc. of benzyl alcohol and 1 drop of concentrated hydrochloric acid was added. The mixture was heated under vacuum by means of an oil bath to 100° C. for a period of one hour and then allowed to cool. The reaction mixture was subjected to steam distillation, then entrained successively in water and in benzene and the residue was finally subjected to chromatography over magnesium silicate with elution with benzene containing 0.75% of acetone. 211 mg. of raw 1′,17β-epoxy-17α-(1′ξ-benzyloxypropyl)-Δ⁴-androstene-3-one were obtained which, after washing with isopropyl ether, had a melting point of about 148° C. and a specific rotation $[\alpha]_D^{20} = -11.5° \pm 1°$ (c.=1% in dioxane). The product was a mixture of A and B epimers having a strong predominance of A epimer.

*Example IX.—Preparation of 1',17β-epoxy-17α-(1'ξ-acetoxypropyl)-Δ⁴-androstene-3-one*

689 mg. of 1',17β-epoxy-17α-(1'ξ-hydroxypropyl)-Δ⁴-androstene-3-one were introduced into 1 cc. of pyridine and while the mixture was subjected to agitation, 1 cc. of acetic anhydride was added. The reaction mixture was subjected to agitation at room temperature for a period of about 65 hours and then was added to a mixture of water and ice and 1 cc. of pyridine. The solution was extracted with a mixture of methylene chloride and ethanol. The extract was washed with water, dried and concentrated. The traces of pyridine were eliminated by entrainment in toluene and 782 mg. of raw 1',17β - epoxy - 17α - (1'ξ-acetoxypropyl)-Δ⁴-androstene-3-one were obtained which was purified by successive recrystallizations from mixtures of isopropyl ether and benzene.

A first yield of 273 mg. of the product were obtained having a melting point of 132–133° C. and a specific rotation $[\alpha]_D^{20} = +81° \pm 1.5°$ (c.=0.7% in dioxane), rich in B epimers and a second lot of product weighing 327 mg. having a melting point of 135–136° C. and a specific rotation $[\alpha]_D^{20} = +55°$ (c.=0.7% in dioxane) was obtained representing a mixture containing about 50% of A and B epimers.

*Analysis of the product of the first lot.*—$C_{24}H_{34}O_4$; molecular weight=386.51. Calculated: C, 74.57%; H, 8.86%. Found: C, 74.6%; H, 8.8%.

The product of the second lot (A+B) was soluble in ether, benzene, chloroform, slightly soluble in cyclohexane and insoluble in water and isopropyl ether.

This compound is not described in the literature.

To isolate the B epimer, two successive recrystallizations of the first lot (having a melting point of 132° C. and a specific rotation $[\alpha]_D^{20} = +81°$) were effected from cyclohexane and isopropyl ether. 81 mg. of product having a melting point of 136° C. and a specific rotation $[\alpha]_D^{20} = +108° \pm 1.5°$ (c.=0.7% in dioxane) were obtained corresponding to about 94% of B epimer and 6% of A epimer of 1',17β-epoxy-17α-(1'ξ-acetoxypropyl)-Δ⁴-androstene-3-one.

To isolate the A epimer, having a lower rotatory power, 1',17β-epoxy-17α-(1'ξ-acetoxypropyl) - Δ⁴ - androstene-3-one was prepared again following the method described above, but by changing the proportions of the compounds put through the process and obtaining starting from 1.035 mg. of 1',17β-epoxy-17α-(1'ξ-hydroxypropyl)-Δ⁴-androstene-3-one, 943 mg. of a first lot having a melting point of about 126° C. and a specific rotation $$[\alpha]_D^{20} = +41.5° \pm 1.5°$$

(c.=0.7% in dioxane) representing a mixture of 40% of B epimer and 60% of A epimer. The said first lot of the product was then successively recrystallized two times from isopropyl ether containing benzene to obtain 294 mg. of a lot of product having a melting point of 142° C. and a specific rotation $[\alpha]_D^{20} = +17°$, and 140 mg. of a lot having a melting point of 134° C. and a specific rotation $[\alpha]_D^{20} = +59°$ were also obtained.

The part of the product having a melting point of 142° C. was successively recrystallized from cyclohexane, then from isopropyl ether to obtain 107 mg. of a product having a melting point of 150° C. and a specific rotation of $[\alpha]_D^{20} = -7.5° \pm 1.5°$ (c.=0.7% in dioxane) which represented the A epimer of 1',17β-epoxy-17α-(1'ξ-acetoxypropyl)-Δ⁴-androstene-3-one.

*Analysis.*—$C_{24}H_{34}O_4$; molecular weight=386.51. Calculated: C, 74.57%; H, 8.8%. Found: C, 74.4%; H, 8.8%.

This product was soluble in ether, benzene and chloroform, slightly soluble in cyclohexane and isopropyl ether and insoluble in water.

*Example X.—Preparation of the 1'ξ,1'ξ-ether oxide of 1'ξ,17β - epoxy-17α-(1'ξ-hydroxypropyl)-Δ⁴-androstene-3-one*

376 mg. of 17α-(3',4'-dihydroxy-butyl)-Δ⁴-androstene-17β-ol-9-one were dissolved in 4 cc. of dimethylformamide. 564 mg. of ammonium periodate were then added and the reaction mixture was subjected to agitation at room temperature for a period of about three hours. Then 50 cc. of water were added and the precipitate formed was vacuum filtered, washed with water and dried. The said product was taken up with hot benzene, filtered, concentrated, methanol added and cooled to 0° C. The crystals formed were vacuum filtered, washed with methanol and dried to obtain 150 mg. of the raw 1'ξ,1'ξ-ether oxide of 1'ξ,17β-epoxy-17α-(1'ξ-hydroxypropyl)-Δ⁴-androstene-3-one which was purified by recrystallization in benzene with the addition of methanol. The purified product had a melting point of 315° C. and a specific rotation $[\alpha]_D^{20} = -36° \pm 1°$ (c.=1% in dioxane).

The product was soluble in benzene and chloroform, slightly soluble in alcohols and insoluble in water, methanol and dilute aqueous acids and alkalis.

*Analysis.*—$(C_{22}H_{31}O_{2.5})_2$; molecular weight=670.94. Calculated: C, 78.75%; H, 9.31%. Found: C, 78.6%; H, 9.3%.

This compound is not described in the literature.

The product was easily hydrolyzed in an acidic media and in the presence of alcohol as the solvent, the corresponding alcoxy derivative was obtained.

Thus, starting from 157 mg. of the 1'ξ,1'ξ-ether oxide of 1'ξ,17β-epoxy-17α-(1'ξ-hydroxypropyl)-Δ⁴-androstene-3-one in 5 cc. of methanol, there were prepared in the presence of concentrated sulfuric acid, 37 mg. of 1',17β-epoxy-17α-(1'ξ-methoxypropyl) - Δ⁴ - androstene - 3 - one having a melting point of about 125° C. and a specific rotation $[\alpha]_D^{20} = +114° \pm 1°$ (c.=1% in dioxane). This corresponded to a mixture of A and B epimers rich in B epimer having a higher rotatory power.

Various modifications of the process of the invention may be made without departing from the spirit or scope thereof and it is to be understood that the invention is intended to be limited only as defined in the appended claims.

We claim:

1. A compound selected from the group consisting of A and B epimers and mixtures of A and B epimers of 1',17β-epoxy-17α-(1'-hydroxypropyl) - Δ⁴ - androstene-3-one.

2. A compound selected from the group consisting of A and B epimers and mixtures of A and B epimers of a compound having the formula

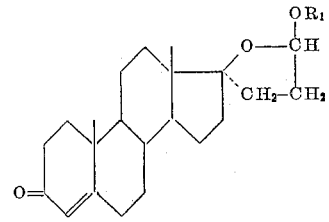

wherein $R_1$ is selected from the group consisting of lower alkyl, phenyl lower alkyl and an acyl radical of an organic carboxylic acid having 1 to 7 carbon atoms.

3. A compound selected from the group consisting of A and B epimers and mixtures of A and B epimers of 1',17β-epoxy-17α-(1'-methoxypropyl) - Δ⁴ - androstene-3-one.

4. A compound selected from the group consisting of A and B epimers and mixtures of A and B epimers of 1',17β-epoxy-17α-(1'-benzyloxypropyl) - Δ⁴ - androstene-3-one.

5. A compound selected from the group consisting of A and B epimers and mixtures of A and B epimers of 1',17β-epoxy-17α-(1'-acetoxypropyl) - Δ⁴ - androstene-3-one.

6. A compound selected from the group consisting of A and B epimers and mixtures of A and B epimers of 1',1'-ether oxide of 1',17β-epoxy-17α-(1'-hydroxypropyl)-Δ⁴-androstene-3-one.

7. The A epimer of 1',17β-epoxy-17α-(1'-hydroxypropyl)-Δ⁴-androstene-3-one having a melting point of 210° C. and a specific rotation $[\alpha]_D^{20} = +18°$ (c.=1% in dioxane).

8. The A epimer of 1',17β-epoxy-17α-(1'-methoxypropyl)-Δ⁴-androstene-3-one having a melting point of 125° C. and a specific rotation $[\alpha]_D^{20} = -25° \pm 2°$ (c.=0.65% in dioxane).

9. The B epimer of 1',17α-epoxy-17α-(1'-methoxypropyl)-Δ⁴-androstene-3-one having a melting point of 143° and a specific rotation $[\alpha]_D^{20} = +140° \pm 1.5°$ (c.=0.65% in dioxane).

10. The A epimer of the 1',1'-ether oxide of 1',17β-epoxy-17α-(1'-hydroxypropyl)-Δ⁴-androstene-3-one having a melting point of 315° C. and a specific rotation $[\alpha]_D^{20} = -36° \pm 1°$ (c.=1% in dioxane).

11. A process for the preparation of the lactone of ω-(Δ⁴-androstene-17β-ol-3-one - 17α - yl)-propionic acid which comprises reacting Δ⁴-androstene-3,17-dione with a secondary amine selected from the group consisting of dilower alkylamine, morpholine, pyridine and pyrrolidine to form the corresponding 3-enamino-Δ³,⁵-androstadiene-17-one, reacting the latter with a magnesium derivative of a ketonide of 1,2-dihydroxy-4-halo-butane having the formula

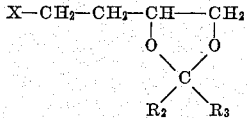

wherein $R_2$ and $R_3$ are alkyl radicals having 1 to 10 carbon atoms and X is a halogen to form the corresponding ketonide of 3-enamino-17α-(3',4'-dihydroxybutyl)-Δ³,⁵-androstadiene-17β-ol, hydrolyzing the latter to form 17α-(3',4'-dihydroxybutyl)-Δ⁴-androstene-17β-ol-3-one, simultaneously degrading and cyclizing the lateral chain of the latter with periodic acid to form 1',17β-epoxy-17α-(1'ξ-hydroxypropyl)-Δ⁴-androstene-3-one, oxidizing the latter with a sulfuric acid-chromic acid mixture in aqueous acetone to form the lactone of ω-(Δ⁴-androstene-17β-ol-3-one-17α-yl)-propionic acid.

12. A process for the preparation of the lactone of ω-(Δ⁴-androstene-17β-ol-3-one - 17α - yl)-propionic acid which comprises reacting Δ⁴-androstene-3,17-dione with a secondary amine selected from the group consisting of dilower alkylamine, morpholine, pyridine and pyrrolidine to form the corresponding 3-enamino-Δ³,⁵-androstadiene-17-one, reacting the latter with a magnesium derivative of a ketonide of 1,2-dihydroxy-4-halo-butane having the formula

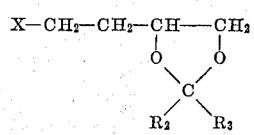

wherein $R_2$ and $R_3$ are alkyl radicals having 1 to 10 carbon atoms and X is a halogen to form the corresponding ketonide of 3-enamino-17α-(3',4'-dihydroxybutyl)-Δ³,⁵-androstadiene-17β-ol, hydrolyzing the latter to form 17α-(3',4'-dihydroxybutyl)-Δ⁴-androstene-17β-ol - 3 - one and oxidizing the latter with an oxidizing agent selected from the group consisting of chromic acid anhydride in aqueous acetic acid and a mixture of sulfuric acid and chromic acid in acetone to form the lactone of ω-(Δ⁴-androstene-17β-ol-3-one-17α-yl)-propionic acid.

References Cited by the Examiner

UNITED STATES PATENTS

| | | | |
|---|---|---|---|
| 2,781,342 | 2/1957 | Herr et al. | 260—239.5 |
| 2,938,031 | 5/1960 | Bible et al. | 260—239.55 |
| 3,137,690 | 6/1964 | Johns | 260—239.55 |

LEWIS GOTTS, *Primary Examiner.*

T. M. MESHBESHER, *Assistant Examiner.*

UNITED STATES PATENT OFFICE
CERTIFICATE OF CORRECTION

Patent No. 3,280,115                        October 18, 1966

Daniel Bertin et al.

It is hereby certified that error appears in the above numbered patent requiring correction and that the said Letters Patent should read as corrected below.

Column 3, line 47, for "is" read -- in --; line 48, for "either" read -- ether --; column 9, line 7, for "C.$\pm$0.5%" read -- C=0.5% --; line 24, for "$\Delta^4$,17-dione" read -- $\Delta^4$-androstene-3,17-dione --; column 11, line 58, for "solwly" read -- slowly --; column 16, line 5, for "17β-ol-9" read -- 17β-ol-3 --; column 17, line 18, for "C=0.65%" read -- C=0.7% --.

Signed and sealed this 21st day of November 1967.

(SEAL)
Attest:

Edward M. Fletcher, Jr.                        EDWARD J. BRENNER

Attesting Officer                              Commissioner of Patents